(12) United States Patent
Swope

(10) Patent No.: US 7,335,122 B2
(45) Date of Patent: *Feb. 26, 2008

(54) LOW MODULUS BELT FOR AUTOMOTIVE APPLICATIONS

(75) Inventor: Jay D. Swope, Nixa, MO (US)

(73) Assignee: Dayco Products, LLC, Miamisburg, OH (US)

(*) Notice: Subject to any disclaimer, the term of this patent is extended or adjusted under 35 U.S.C. 154(b) by 645 days.

This patent is subject to a terminal disclaimer.

(21) Appl. No.: 10/438,755

(22) Filed: May 15, 2003

(65) Prior Publication Data

US 2004/0038764 A1 Feb. 26, 2004

Related U.S. Application Data

(63) Continuation-in-part of application No. 09/848,132, filed on May 3, 2001, now Pat. No. 6,832,968.

(51) Int. Cl.
*F16G 1/00* (2006.01)

(52) U.S. Cl. .................... 474/260; 474/263

(58) Field of Classification Search ........ 474/260, 474/263, 237, 135; 123/90.23; 428/395, 428/375, 365, 288; 525/179, 432; 156/137–138
See application file for complete search history.

(56) References Cited

U.S. PATENT DOCUMENTS

| | | | | |
|---|---|---|---|---|
| 3,643,518 A | * | 2/1972 | Semin et al. | 474/139 |
| 4,343,343 A | * | 8/1982 | Reuter | 152/556 |
| 4,787,200 A | * | 11/1988 | Inada et al. | 57/242 |
| 4,822,324 A | * | 4/1989 | Georget | 474/268 |
| 4,931,030 A | * | 6/1990 | Robecchi | 474/237 |
| 4,936,814 A | * | 6/1990 | Colley et al. | 474/263 |
| 5,021,034 A | * | 6/1991 | Allen | 474/174 |
| 5,354,242 A | * | 10/1994 | St. John | 474/135 |
| 5,425,681 A | * | 6/1995 | Van Hook | 474/263 |

FOREIGN PATENT DOCUMENTS

| | | | | |
|---|---|---|---|---|
| DE | 2623270 A1 | * | 1/1977 | |
| DE | 4038465 A1 | * | 6/1992 | |
| EP | 0489298 A2 | * | 6/1992 | |
| JP | 04-40 A | * | 1/1992 | 474/260 |
| JP | 05-195359 A | * | 8/1993 | 57/2 |
| JP | 06-25977 A | * | 2/1994 | |
| JP | 09-250041 A | * | 9/1997 | |

* cited by examiner

*Primary Examiner*—Marcus Charles
(74) *Attorney, Agent, or Firm*—Joseph V. Tassone; Thompson Hine LLP

(57) ABSTRACT

A low modulus drive belt for an automotive accessory drive system is disclosed that allows for relatively high elongation during installation and that maintains a relatively high percentage of its install tension throughout the useful life of the belt. In addition, an automotive accessory drive system is taught that utilizes such a belt as is a method for constructing such a belt. According to one aspect an accessory drive system for an automobile is provided that includes: (a) a drive pulley; (b) an accessory pulley operatively coupled to an accessory drive shaft; and (c) an endless drive belt engaged between the drive pulley and the accessory pulley, where the drive belt includes an endless band of rubber composite material having a plurality of circumferentially extending an axially aligned polyamide 6.6 twisted cords formed therewithin.

29 Claims, 1 Drawing Sheet under 1,575 lbf/in/in loading is approximately 2% to approximately 3% lower than the nominal drive length of the accessory drive system; and (f) where the operational torque of the two-pulley accessory drive system is less than, or equal to, approximately 2.7 N-m (2 ft-lb).

LOW MODULUS BELT FOR AUTOMOTIVE APPLICATIONS

CROSS-REFERENCE TO RELATED APPLICATIONS

This application is a continuation-in-part of U.S. application Ser. No. 09/848,132 filed May 3, 2001 now U.S. Pat. No. 6,832,968.

BACKGROUND

The present invention is directed to a multiple-pulley accessory drive system for an automobile; and more specifically, to an accessory drive belt for such an accessory drive system.

The present invention was specifically developed to address the need for an accessory drive belt capable of relatively easy installation by stretching the drive belt over the pulleys of the multiple-pulley accessory drive system, where this drive belt maintains sufficient tension throughout the design life of the drive system.

SUMMARY

The present invention provides a low modulus drive belt for an automotive, multiple-pulley accessory drive system that allows for relatively high elongation during installation and that maintains a relatively high percentage of its install tension throughout the useful life of the belt. The present invention also provides an automotive, multiple-pulley accessory drive system that utilizes such a belt and provides a method for constructing such a belt.

A first aspect of the present invention is directed to a multiple-pulley accessory drive system for an automobile that comprises: (a) a drive pulley; (b) an accessory pulley operatively coupled to an accessory drive shaft; and (c) an endless drive belt engaged between the drive pulley and the accessory pulley, where the drive belt includes an endless band of rubber composite material having a plurality of circumferentially extending an axially aligned polyamide 6.6 twisted cords formed therewithin and the belt's tensile modulus per width is about 400 to 1500 N/mm. Tensile modulus per width is expressed as force (N) per % elongation (mm/mm) per 1 mm belt width, i.e., N/mm. In a more particular embodiment, the tensile modulus per width of the belt is about 400 to 1200 N/mm. In a still more particular embodiment, the tensile modulus per width of the belt is about 600 to 1000 N/mm.

Tensile modulus per width is determined by plotting tension (T) versus elongation for the belt and determining the slope of the best-fit line where elongation is the change in belt length when tensioned by a force T divided by the belt length when tensioned by the initial pre-load tension. The slope (m) divided by the belt width (mm) is the tensile modulus per width.

In a more detailed embodiment of this first aspect of the invention, the circumferential length of the endless drive belt, before installation of the pulleys, is approximately 2% to approximately 3% lower than the nominal drive length of the accessory drive system. In a further detailed embodiment, the circumferential length of the endless drive belt, before installation on the pulleys, is approximately 2% to approximately 2.3% lower than the nominal drive length of the accessory drive system. In yet a further detailed embodiment, the axial distance between the distant cords is approximately 0.80 mm to approximately 1.0 mm. In yet a further detailed embodiment, each twisted cord includes a pair of yarn strands twisted together. In yet a further detailed embodiment, each cord has diameter of approximately 0.58 mm (0.023 in.).

In an alternative detailed embodiment of the first aspect of the present invention, the endless drive belt has a tensile modulus of approximately 7000 N/mm/mm (1575 lbf/in/in) to approximately 10,000 N/mm/mm (2250 lbf/in/in); and in an even more detailed embodiment, the endless drive belt has a tensile modulus of approximately 7800 N/mm/mm (1750 lbf/in/in) to approximately 8,500 N/mm/mm (1910 lbf/in/in). In yet a further detailed embodiment, the circumferential length of the endless drive belt, before installation on the pulleys, is approximately 2% to approximately 3% lower than the nominal drive length of the accessory drive system.

In another alternative embodiment to the first aspect of the present invention, the operational torque of the accessory drive system is less than, or equal to approximately 2.7 N-m (2 ft-lb). In a further detailed embodiment, the accessory is an automotive water pump, and the accessory pulley is operatively coupled to a drive shaft of the water pump.

It is a second aspect of the present invention to provide a multiple-pulley accessory drive system for an automobile that includes: (a) a drive pulley; (b) an accessory pulley operatively coupled to an accessory drive shaft; (c) an endless drive belt engaged between the drive pulley and the accessory pulley, where the drive belt includes an endless band of rubber composite material having a plurality of circumferentially extending and axially aligned cords formed therewithin; (d) where the endless drive belt has a tensile modulus of approximately 7,000 N/mm/mm (1575 lbf/in/in) to approximately 10,000 N/mm/mm (2250 lbf/in/in). In a further detailed embodiment, the circumferential length of the endless drive belt, before installation on the pulleys, is approximately 2% to approximately 3% lower than the nominal drive length of the accessory drive system. In yet a further detailed embodiment, the circumferential length of the endless drive belt, before installation on the pulleys, is approximately 2% to approximately 2.3% than the lower nominal drive length of the accessory drive system. In yet a further detailed embodiment, the cords are polyamide twisted cords.

In an alternate detailed embodiment of the second aspect of the present invention the operational torque of the accessory drive system is less than or equal to approximately 2.7 N-m (2 ft-lb). In a further detailed embodiment, the accessory is an automotive water pump and the accessory pulley is operatively coupled to a shaft of the water pump. In a further detailed embodiment, the multiple-pulley accessory drive system is a two-pulley accessory drive system.

In an alternative detailed embodiment of the second aspect of the present invention, the endless drive belt has a tensile modulus of approximately 7,800 N/mm/mm (1750 lbf/in/in) to approximately 8,500 N/mm/mm (1910 lbf/in/in).

It is a third aspect of the present invention to provide a two-pulley accessory drive system for an automobile that includes: (a) a drive pulley; (b) an accessory pulley operatively coupled to accessory drive shaft; (c) an endless drive belt engaged between the drive pulley and the accessory pulley, where the drive belt includes an endless band of rubber composite material having a plurality of circumferentially extending and axially aligned cords formed therewithin; (d) where the endless drive belt has a tensile modulus of approximately 8500 N/mm/mm (1910 lbf/in/in); and (e) where the circumferential length of the endless drive belt, before installation on the pulleys, is approximately 2.2% to approximately 2.3% lower than the nominal drive length between the drive pulley and the accessory pulley. In a further detailed embodiment the cords are polyamide 6.6 twisted cords.

A fourth aspect of the present invention is directed to a multiple-pulley system for an automobile that includes: (a) drive pulley; (b) an accessory pulley operatively coupled to an accessory drive shaft; and (c) a endless drive belt engaged between the drive pulley and the accessory pulley, where the drive belt includes an endless band of rubber composite material having a plurality of circumferentially extending and axially aligned, polyamide 6.6 twisted cords formed therewithin; (d) where the circumferential length of the endless drive belt, before installation on the pulleys is approximately 2.2% to approximately 2.3% lower than the nominal drive length of the accessory drive system. In a further detailed embodiment, the axial distance between the twisted cords is approximately 0.3 mm (0.012 in.) and each of the twisted cords includes a pair of cord yarns twisted together, where each cord has a diameter of approximately 0.58 mm (0.023 in.).

In an alternate detailed embodiment of the fourth aspect of the present invention, the operational torque of the accessory drive system is less than, or equal to approximately 2.7 N-m (2 ft-lbs). In a further detailed embodiment, the accessory is an automotive water pump and the accessory pulley is operatively coupled to a drive shaft of the water pump.

A fifth aspect of the present invention is directed to a method for fabricating an accessory drive belt that includes the steps of: (a) applying at least a layer of fabric or rubber material to an outer circumferential surface of a drum; (b) applying at least a first layer of cushion stock rubber material to the drum over the fabric layer; (c) winding a polyamide 6.6 twisted cord to the drum over the first layer of cushion stock; (d) applying a layer of relatively strong and wear resistant, fiber loaded, rubber material to the drum over the cords; (e) curing the multiple layers together into a cured sleeve of belt composite material; (f) cutting the cured sleeve into a plurality of endless belts; and (g) turning the endless belt inside-out for use as an accessory drive belt; (h) where the polyamide 6.6 twisted cord is wound in the winding step at approximately 3 lbf. (13 N) to approximately 3.5 lbf. (15.5 N). In a more detailed embodiment, the winding step axially spaces the winds of the polyamide 6.6 twisted cord at approximately 0.40 mm (26 cpi) to approximately 0.30 mm (30 cpi). In yet a further detailed embodiment the method further includes the step of, prior to the step of turning the endless belt inside out, forming a plurality of circumferential grooves into the outer circumferential surface of the cured sleeve or of the endless belts. In an alternate detailed embodiment to the fifth aspect of the present invention, the method includes, after the winding step (c) and before the applying step (d), the step of (c1) applying at least a second layer of the cushion stock over the cords.

A sixth aspect of the present invention is directed to an accessory drive belt for an automobile comprising a composite rubber and reinforcing cord composite, where the belt is adapted to be manually stretched on the pulleys of the accessory drive system and has an install tension; and where the belt maintains approximately at least 40% of its install tension throughout the useful life of the belt. In a detailed embodiment, the belt maintains at least approximately 40% to approximately 60% of its install tension throughout the useful life of the belt. In a further detailed embodiment, the cords in the composite are polyamide 6.6 twisted cords.

The lower modulus belts used in accordance with this invention have advantages over higher modulus belts. In particular, the belts can be designed for and used in applications in which lower installation tensions are desired or required. Because lower installation tensions are available, the expected service life and, more particularly, the bearing life of the accessory driven by the belt will typically be longer. With a lower modulus belt the reduction/loss in modulus over the life of the belt is less. This reduces installation tension requirements. Belts are conventionally installed at higher tension to compensate for the loss in tension over the life of the belt. Because there will be less tension loss with a lower modulus belt, lower installation tensions can be used. The belts can also be installed by hand in some applications.

DETAILED DESCRIPTION

The present invention provides a low modulus drive belt for an automotive, multiple-pulley accessory drive system that allows for relatively high elongation during installation and that maintains a relatively high percentage of its install tension throughout the useful life of the belt. The present invention also provides an automotive, multiple-pulley accessory drive system that utilizes such a belt and provides a method for constructing such a belt.

Figure 1:
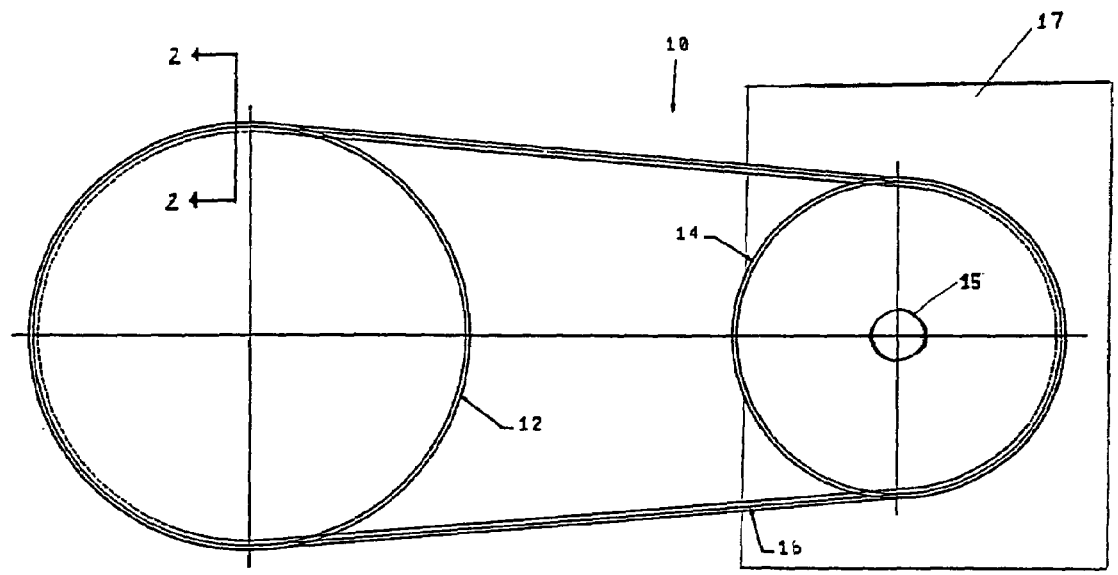
FIG. 1 is a schematic view of a multiple-pulley accessory drive system according to a first aspect.

As shown in FIG. 1, an example of a rear-end accessory drive system 10 for use in an automobile includes a drive pulley 12 driven by the automobile's engine and an accessory pulley 14 operatively coupled to the drive shaft 15 of the accessory component, such as the water pump 17 of the automobile. A drive belt 16 is engaged between the pulleys 12, 14 to transfer rotational force from the drive pulley 12 to the accessory pulley 14. In an exemplary embodiment, the relative maximum speed for this accessory drive system is approximately 3400 rpm with a relative maximum torque of approximately 2.7 N-m (2 ft-lbs). Accordingly, in this exemplary embodiment, the belt 16 for use with this drive maintains a drive tension of at least approximately 89 N (20 lbf.) and has an install tension of at most approximately 445 N (100 lbf). It will be appreciated that, while the accessory drive system of the exemplary embodiment includes only two pulleys, it is within the scope of the invention that the accessory drive system include more than two pulleys.

Figure 2:
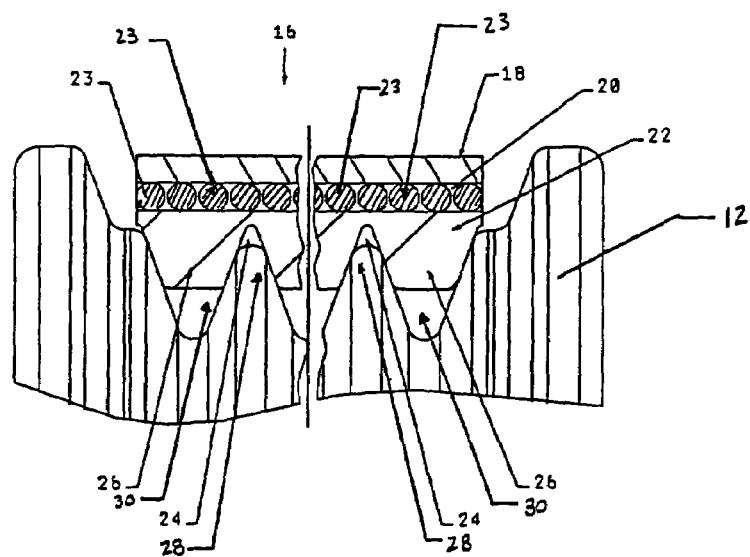
FIG. 2 is a cutaway cross-section view along line 2-2 in FIG. 1 of a belt and pulley according to one embodiment.

As shown in FIG. 2, the exemplary embodiment of the belt 16 is a multi-layer composite structure that includes an outer, cover layer 18 of friction fabric material or rubber material bonded to a layer 20 of cushion rubber material, which is bonded to an inner layer 22 of wear-resistant rubber material. The layer 20 of cushion rubber material, in the exemplary embodiment, includes a plurality of axially aligned, polyamide 6.6 twisted cords 23 extending longitudinally therethrough. The inner layer 22 of wear-resistant rubber material is, in the exemplary embodiment, an EPDM compound selected according to environmental and performance factors that is impregnated with reinforcing fibers. Such a fiber-impregnated compound is shown, for example, in U.S. Pat. Nos. 5,267,908 and 5,518,460 (see also, U.S.

Pat. Nos. 5,273,496, 5,334,107, 5,507,699). Additionally, in the exemplary embodiment, the cushion material in the layer 20 is an elastomeric compound compatible for curing with, and around the cords 23 and compatible for bonding to the inner layer 22 of wear-resistant rubber material. Additionally, in the exemplary embodiment, the polyamide 6.6 twisted cords 23 are comprised of a pair of 6.6 polyamide yarn strands twisted together, where the finished cord has a diameter of approximately 0.58 mm (0.023 in.). Such a construction is commonly referred to by those of ordinary skill in the art as a "840/1/2" cord construction (denier/yarns-per-ply/plies-per-cord). It will be appreciated to those of ordinary skill in the art that alternate arrangements of the 6.6 polyamide yarn strands can be used to create alternate constructions of the twisted cords that include, but are not limited to, 840/1/2, 840/1/3, 1000/1/2, 660/1/3, etc. It has been found that a particularly desirable belt construction is one in which the cord construction is 840/1/2 or 840/1/3 and the cord spacing is 30 cpi.

Finally, in certain embodiments, the axial or lateral spacing between the polyamide 6.6 twisted cords is approximately 30 cords per inch (cpi) to approximately 26 cpi, while in one embodiment, the spacing is approximately 30 cpi.

In one embodiment, the drive belt 16 is a polyribbed belt since it includes a plurality of longitudinal grooves 24 cut into the inner surface of the belt, forming a complimentary plurality of ribs 26, where such ribs and grooves 24, 26 are received within corresponding ribs 28 and grooves 30 on the pulleys 12, 14. The number of ribs in the belt can vary. The width (number of ribs) can be selected to provide the tension that is desired. Belts having 2, 3, 4, 6 and up to 25 or more ribs are known in the art. Although the figure illustrates a polyribbed belt, the invention can also take the form of a flat belt, a V-belt or a banded V-belt.

Before installation on the accessory drive 10, in certain embodiments, the length of the belt 16 is approximately 2% to approximately 3% lower than the nominal drive length between the drive pulley 12 and accessory pulley 14 (where the nominal drive length is the length of a taut belt when carried on the drive pulley and accessory pulley; or, if more than two pulleys are used in the accessory drive system, the nominal drive length is the length of a taut belt when carried on all the pulleys of the accessory drive system). In the exemplary embodiment, the length of the drive belt 16, before installation on the pulleys, is approximately 2.2% to approximately 2.3% lower than the nominal drive length between the drive pulley 12 and the accessory pulley 14. Such a reduced length of the drive belt 16, in combination with the construction of the drive belt 16 as discussed herein, provides the drive belt with an operational drive tension of approximately 111 N (25 lbf.) to approximately 200 N (45 lbf.) over the operational life of the belt 16, which, for a three-ribbed belt, is typically 241,401 Km (150,000 miles) of operation for the automobile on which the belt 16 is used. Operational life will change for other configurations of the belt, i.e., 6-rib belt configurations.

In one embodiment, the belts 16 are produced utilizing a novel version of the fabrication method commonly known as the "flycut" method. This involves the application of cover a layer of bias cut friction fabric (woven, non-woven, knit, etc.) or rubber material to an outer surface of a cylindrical drum; applying a layer of cushion stock rubber over the layer of friction fabric on the drum; spinning the polyamide 6.6 twisted cords around the drum at a predetermined spacing and tension, applying an optional second layer of the cushion stock rubber around the cords spun over the first layer of cushion stock rubber, applying a layer of relatively strong and wear-resistant fiber loaded, rubber material to the drum over the second layer of cushion stock (or over the wound cords if no optional second layer of cushion stock used), curing the layers wrapped on the drum (using high-pressure steam, for example) such that the layers of cushion stock rubber material flow around the polyamide 6.6 twisted cords and bond to the cover layer of bias-cut friction fabric and to the layer of strong and wear-resistant, fiber loaded, rubber material. Once cured, the composite layers are removed from the curing area or vessel (high-pressure steam) and cooled to stop the curing process. Next, the tubular sleeve of cured composite material is cut into the individual belts and the belts are taken to a profiling machine so that the grooves can be cut into the outer surface of the belts. Once the grooves are cut the belts may be turned inside out for use on the accessory drive system.

In one embodiment the polyamide 6.6 twisted cords are wound over the first layer of cushion stock rubber at a cord spinning tension of approximately 15.5 N (3.5 lbf.). Additionally, as discussed above, in the exemplary embodiment, the winds of the cord are spaced at a distance of approximately 0.30 mm (0.012 in).

The above process is merely an exemplary process for constructing an exemplary belt according to the present invention. It will be apparent to those of ordinary skill in the art that alternate combinations of layers, material and steps may be used and still remain within the scope of at least certain aspects of the present invention. For example, both layers of cushion stock rubber may be eliminated if the wear-resistant fiber loaded, rubber material can be cured to flow around the cords and bond to the cover layer. It will also be apparent to those of ordinary skill in the art that the grooves may be formed into the belt using other methods, such as grinding or molding.

The belt's tensile modulus per width is about 400 to 1500 N/mm. In a more particular embodiment, the tensile modulus per width of the belt is about 400 to 1200 N/mm. In a still more particular embodiment, the tensile modulus per width of the belt is about 600 to 1000 N/mm. The belt 16 of the present invention provide a tensile modulus of, in a number of embodiments, at least approximately 7000 N/mm/mm (1575 lbf/in/in); and in more detailed embodiments, approximately 7800 N/mm/mm (1750 lbf/in/in) to approximately 8500 N/mm/mm (1910 lbf/in/in); and in the exemplary embodiment, approximately 8500 N/mm/mm (1910 lbf/in/in). Therefore, the belt according to the exemplary embodiment is a low modulus belt with a relatively high elongation throughout the installation range. The belt of the exemplary embodiment has been found to maintain a relatively high percentage of its install tension (approximately 40% to approximately 60% of its install tension) throughout the life of the belt, in both cold "non-operating" conditions and in hot "operating" conditions. Such a belt is specifically capable of being installed over the pulleys of the accessory drive by "stretching" the belt over the pulleys; and additionally, the belt is specifically designed to maintain a desired tension throughout the design life of the drive. Because the belt has a relatively low tensile modulus, the tensile force at installation is greatly reduced as compared to conventional belts of this type. For example, the install tension useful with the belt system of the invention can be about 20% lower than with competitive stretchy belts. More particularly, the standard bearing life calculation for ball bearings as reported in: (1) Mechanical Engineering Design—Fourth Edition, Shigley and Mitchell, McGraw-Hill Book Company, Copyright 1983, (2) NTN Ball and Roller Bearings—Technical Data, NTN Corporation, 1990, page A-40, 41, and (3) Ball Screw Support Bearings Manual: Engineering/Fatigue Life/Bearings, page 106 is:

$$L=(C/P)3$$

where: L is Basic Rated Life (106 revolutions) for 90% of a typical group of apparently identical bearings; C is Basic Dynamic Load Rating, and P is Radial Load. For comparison, the basic dynamic load rating C can be considered constant while the radial load P is 0.8 P for the belt in this embodiment and P for a higher modulus belt. Therefore, for a given radial load P as provided by a competitive higher modulus stretchy belt, the belt in this embodiment of the invention will provide 0.8 P, which will increase the Basic Rated Life of the bearings by approximately a factor of 1.95 (i.e. almost 100% increase). This can be shown by substituting 0.8 P in the equation above. Thus, by reducing the nominal belt tension by 20%, overall bearing life (ball bearings) can be increased by approximately a factor of 2 based on the bearing life calculation provided above.

Following from the above description summaries, it should be apparent to those of ordinary skill in the art that, while the apparatus and processes herein described constitute exemplary embodiments of the present invention, it is to be understood that the invention is not limited to these precise apparatuses and processes and that changes may be made therein without departing from the scope of the invention as defined by the claims. Additionally, it is to be understood that the invention is defined by the claims and it is not intended that any limitations or element describing the exemplary embodiments herein are to be incorporated into the meanings of the claims unless such limitations or elements are specifically listed in the claims. Likewise, it is to be understood that it is not necessary to meet any or all of the identified advantages or objects of the present invention disclosed herein in order to fall within the scope of any claim, since the invention is defined by the claims and since inherent and/or unforeseen advantages of the present invention may exist even though they may not be explicitly discussed herein.

What is claimed is:

1. A multiple-pulley accessory drive system for an automobile, comprising:
   a drive pulley;
   at least one accessory pulley operatively coupled to an accessory drive shaft, the drive pulley and accessory pulley having a nominal drive length therebetween; and
   an endless drive belt engaged between the drive pulley and the accessory pulley, the drive belt including an endless band of rubber composite material having a plurality of circumferentially extending and axially aligned, polyamide 6.6 twisted cords formed therewithin and having a tensile modulus per width of about 400 to 1500 N/mm.

2. The multiple-pulley accessory drive system 1 wherein the tensile modulus per width is about 400 to 1200 N/mm.

3. The multiple-pulley accessory drive system 2 wherein the tensile modulus per width is about 600 to 1000 N/mm.

4. The multiple-pulley accessory drive system of claim 3, wherein the circumferential length of the endless drive belt, before installation on the pulleys, is approximately 2% to approximately 3% lower than the nominal drive length of the accessory drive system.

5. The multiple-pulley accessory drive system of claim 4, wherein the circumferential length of the endless drive belt, before installation on the pulleys, is approximately 2% to approximately 2.3% lower than the nominal drive length of the accessory drive system.

6. The multiple-pulley accessory drive system of claim 4, wherein the axial distance between the cords is approximately 0.8 mm to approximately 1.0 mm.

7. The multiple-pulley accessory drive system of claim 6, wherein each twisted cord includes one or more cord yarns twisted together.

8. The multiple-pulley accessory drive system of claim 7, wherein each twisted cord includes a pair of cord strands twisted together.

9. The multiple-pulley accessory drive system of claim 4, wherein the twisted cords are axially distributed at a distribution of approximately 26 to approximately 30 of the twisted cords per inch.

10. The multiple-pulley accessory drive system of claim 4, wherein the operational torque of the accessory drive system is less than, or equal to approximately 2.7 N-m (2 ft-lb).

11. The multiple-pulley accessory drive system of claim 10, wherein the accessory is an automotive water pump and the accessory pulley is operatively coupled to a drive shaft of the water pump.

12. The multiple-pulley accessory drive system of claim 4, wherein the accessory drive system is a two-pulley accessory drive system.

13. The multiple-pulley accessory drive system of claim 1, wherein the endless drive belt has a tensile modulus of at least approximately 7,000 N/mm/mm (1575 lbf/in/in).

14. The multiple-pulley accessory drive system of claim 13, wherein the endless drive belt has a tensile modulus of approximately 7,800 N/mm/mm (1750 lbf/in/in) to approximately 8,500 N/mm/mm (1910 lbf/in/in).

15. A multiple-pulley accessory drive system for an automobile, comprising:
   a drive pulley;
   at least one accessory pulley operatively coupled to an accessory drive shaft, the drive pulley and accessory pulley having a nominal drive length therebetween; and
   an endless drive belt engaged between the drive pulley and the accessory pulley, the drive belt including an endless band of rubber composite material having a plurality of circumferentially extending and axially aligned cords formed therewithin;
   wherein the endless drive belt has a tensile modulus of at least approximately 7000 N/mm/mm (1575 lbf/in/in).

16. The multiple-pulley accessory drive system of claim 15, wherein the circumferential length of the endless drive belt, before installation on the pulleys, is approximately 2% to approximately 3% lower than the nominal drive length of the accessory drive system.

17. The multiple-pulley accessory drive system of claim 16, wherein the circumferential length of the endless drive belt, before installation on the pulleys, is approximately 2% to approximately 2.3% lower than the nominal drive length of the accessory drive system.

18. The multiple-pulley accessory drive system of claim 17, wherein the cords are polyamide twisted cords.

19. The multiple-pulley accessory drive system of claim 15, wherein the operational torque of the accessory drive system is less than, or equal to approximately 2.7 N-m (2 ft-lb).

20. The multiple-pulley accessory drive system of claim 19, wherein the accessory is an automotive water pump and the accessory pulley is operatively coupled to a drive shaft of the water pump.

21. The multiple-pulley accessory drive system of claim 20, wherein the accessory drive system is a two-pulley accessory drive system.

22. The multiple-pulley accessory drive system of claim 15, wherein the endless drive belt has a tensile modulus of approximately 7,800 N/mm/mm (1750 lbf/in/in) to approximately 8,500 N/mm/mm (1910 lbf/in/in).

23. The multiple-pulley accessory drive system of claim 22, wherein the circumferential length of the endless drive belt, before installation on the pulleys, is approximately 2% to approximately 3% lower than the nominal drive length of the accessory drive system.

24. The multiple-pulley accessory drive system of claim 23, wherein the circumferential length of the endless drive belt, before installation on the pulleys, is approximately 2% to approximately 2.3% lower than the nominal drive length of the accessory drive system.

25. The multiple-pulley accessory drive system of claim 24, wherein the cords are polyamide twisted cords.

26. The multiple-pulley accessory drive system of claim 15 wherein the endless drive belt has a tensile modulus of approximately 8500 N/mm/mm (1910 lbf/in/in).

27. The multi-pulley drive system, of claim 4 wherein the drive belt is adapted to be manually stretched on the plurality of pulley at an install tension, and the drive belt maintains at least approximately 40% of the install tension throughout a useful life of the drive belt.

28. The multi-pulley drive system of claim 27, wherein the drive belt maintains at least approximately 40% to approximately 60% of the install tension throughout the useful life of the drive belt.

29. A method for fabricating an accessory drive belt, comprising the steps of:
  applying at least a layer of cover material to an outer circumferential surface of a drum;
  applying at least a first layer of cushion stock rubber material to the drum over the cover layer;
  winding a polyamide 6.6 twisted cord to the drum over the first layer of cushion stock;
  applying a layer of relatively strong and wear resistant, fiber loaded, rubber material to the drum over the polyamide 6.6 twisted cord;
  curing multiple layers together into a cured sleeve of belt composite material;
  cutting the cured sleeve into a plurality of endless belts; and
  turning the endless belts inside-out for use as an accessory drive belt;
  wherein the polyamide 6.6 twisted cord is wound in the winding step at approximately 13 N (3 lbf.) to approximately 15.5 N (3.5 lbf.).

* * * * *